May 13, 1947.  A. HENDERSON  2,420,427
PRECAST REINFORCED CONCRETE MEMBERS
Original Filed May 11, 1945   3 Sheets-Sheet 1

INVENTOR.
Albert Henderson.
BY
Stebbins, Blenko & Webb
his attorneys

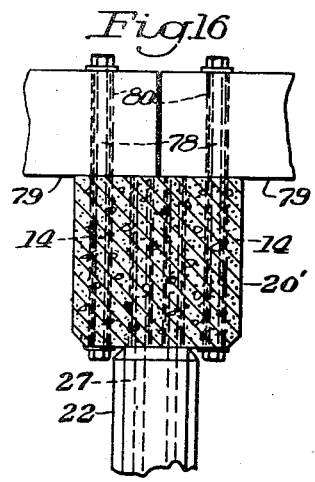
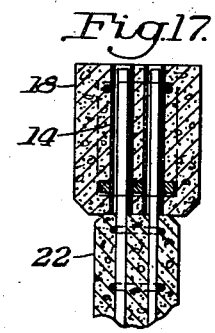
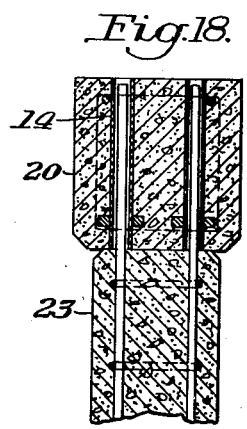
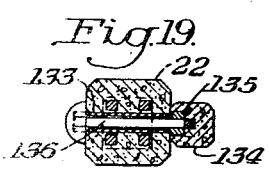
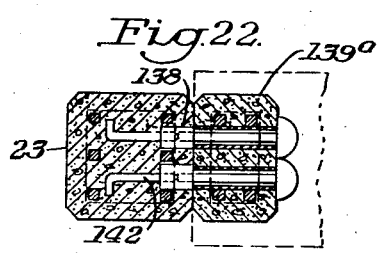
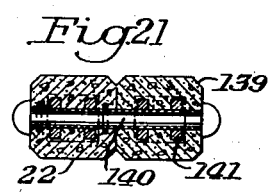
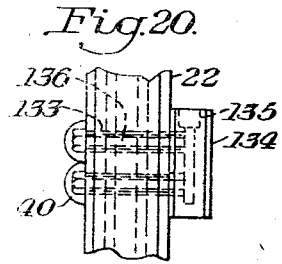
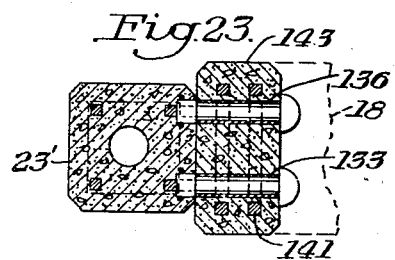
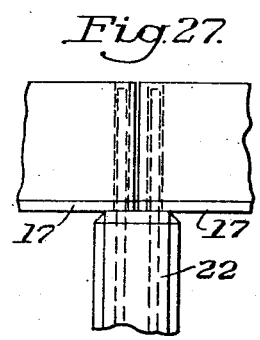
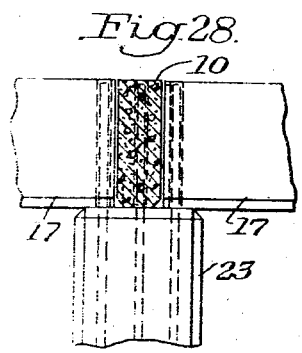
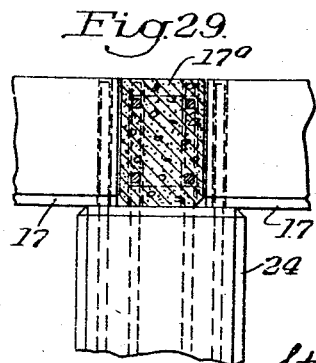

May 13, 1947.    A. HENDERSON    2,420,427
PRECAST REINFORCED CONCRETE MEMBERS
Original Filed May 11, 1945    3 Sheets-Sheet 3

INVENTOR.
Albert Henderson
BY
Stebbins, Blenko & Webb
his attorneys

Patented May 13, 1947

2,420,427

UNITED STATES PATENT OFFICE 2,420,427

PRECAST REINFORCED CONCRETE MEMBERS

Albert Henderson, Edgewood, Pa., assignor to William P. Witherow, Pittsburgh, Pa.

Original application May 11, 1945, Serial No. 593,220. Divided and this application June 29, 1945, Serial No. 602,326

5 Claims. (Cl. 72—107)

1

This invention relates to precast structural members of reinforced concrete and, in particular, to a simplified system of such members whereby many types of structures may be erected using a relatively small number of standard shapes. The several members are so designed that they are adapted to be made in different shapes to function as columns, girders, beams, joists and brackets. Some of the members, such as columns, girders and beams, may be hollow, providing space for the accommodation of pipe lines and electric conduit as well as for the circulation of hot or cold air.

In order to make a system of precast structural members practical, satisfactory forms of connections between the various members are necessary. The lack of such connections is probably the reason for the relatively limited use of precast structural members heretofore. To meet this requirement, I embed lengths of metal pipe in certain of the members such as girders, beams, joists and brackets. The pipe lengths are welded to reinforcing rods embedded in the members, thus imparting the necessary rigidity to the connections. The pipe lengths may also have relatively short metal anchor rods welded thereto for embedding in the members, extending parallel to the longitudinal reinforcing rods therein. By thus welding the reinforcing rods and anchor rods to the pipe lengths, instead of relying on some other form of tie, such as looping the rods around the pipe lengths, I obtain an extremely rigid bond between the pipe lengths and the concrete and avoid any danger of cracking of the concrete adjacent the pipe lengths which would result in breaking the bond therebetween.

The importance of this feature is readily observed from the table of allowable stresses in concrete under shear in terms of percentages of the ultimate compressive strength (Building Regulations for Reinforced Concrete, American Concrete Institute, Detroit, Michigan, 1941) as follows:

| | Percent |
|---|---|
| 1. Beams with no web reinforcement and without special anchorage of longitudinal steel | 2 |
| 2. Beams with no web reinforcement but with special anchorage of longitudinal steel | 3 |
| 3. Beams with properly designed web reinforcement but without special anchorage of longitudinal steel | 6 |
| 4. Beams with properly designed web reinforcement and with special anchorage of longitudinal steel | 12 |

2

Members embodying my invention are in the last of the above groupings and thus have an allowable shear stress several times that of members without anchorage of the longitudinal reinforcing rods.

The pipe lengths to which the rods are welded also afford means to position the rods accurately in the forms and maintain them rigidly in position while pouring concrete.

I preferably employ pipe of a convenient size, such as 1½", for embedding in the members to provide the necessary connections. The pipe lengths are preferably positioned in the members so that their centers are substantially 2½" from the nearest surface of the member, thus providing an adequate thickness of concrete to protect the pipe lengths from fire and corrosion.

The various types of members are made in several widths, each of which is an integral multiple of the width of the narrowest size. The member of the narrowest width has connections composed of one pipe length emedded therein. The members of greater widths have two pipe lengths embedded therein for each connection. The center-to-center spacing between the pipe lengths of the members other than the smallest, increases by a distance equal to the width of the latter. For example, if the width of the narrowest member of one type is 4", the next larger sizes are 8", 12" and 16". The 4" wide member has one pipe length embedded therein for each connection. The remaining members have two pipe lengths embedded therein for each connection. The center-to-center spacing of the pipe lengths in the 8" wide member is 3", in the 12" wide member 7" and in the 16" wide member 11".

The embedded pipe lengths permit adjacent members to be secured together by means of dowels embedded in one member and extending through a pipe length in the other. In some cases pipe lengths embedded in two or more members are disposed in alinement and a common bolt therethrough secures them together. As a further alternative, a nut may be embedded in one member and a bolt inserted through a pipe length in another member and threaded into the nut. In any case, the embedded pipe length serves as an essential element of the combination. In the case of columns, the longitudinal reinforcing rods project above the top of the column and pass through pipe lengths embedded in girders or beams. The space between the rods and the interior of the pipe lengths is then filled with grout. It is important that the embedded pipe lengths have definite positions in the members with respect to the reinforcing rods thereof. The outermost longitudinal reinforcing rods in the girders and beams are substantially in alinement with the pipe lengths and the column-reinforcing rods are substantially in line with the voids left by the pipe lengths in the girders and beams. The spacing of the longitudinal reinforcing rods of the various members is also such as to permit a pipe length of the desired size, e. g., 1½" inside diameter and substantially 2" outside diameter to pass between them. This is particularly important when a column 8" wide supports a girder or beam 12" wide, or a column 12" wide supports a girder or beam 16" wide. It is also important when brackets are used. Furthermore, the spacing between the longitudinal rods should allow a 1½" nut to be welded to two parallel longitudinal reinforcing rods.

The various precast concrete members (i. e., columns, girders, beams, etc.) having widths of 4", 8", 12" and 16" are made in various depths differing by 2". This applies to all the various shapes including brackets and permits the use of metal stirrups of the same width for a given width of column, girder, beam and brackets. The stirrups used for the size of members next larger than the minimum width can be also applied to members of larger widths. For example, two stirrups may be used in the members 12" wide and three in the members 16" wide.

The member of minimum width 4", has one lower and one upper primary longitudinal reinforcing rod. The member of the next larger width, 8", has two similar rods, the 12" wide member three, and the 16" wide member four. This arrangement permits the rods nearest the side faces of the members substantially to abut the embedded pipe lengths and permits them to be welded thereto. An exception occurs when a pipe length fits between two longitudinal reinforcing rods. In that case, the rods are welded to opposite sides of the pipe passing therebetween. In some cases, a nut is welded to a reinforcing rod or a pipe length. This permits making a connection where a reinforcing rod and a pipe length lie in the same plane.

The widths of the various members (4", 8", 12" and 16") are integral multiples of the width of the smallest similar member and the widths and depths of the various members are appropriately related. Similarly, the depths of the various members vary by a predetermined increment.

The 4", 8", 12" and 16" wide members have 1, 2, 3 and 4 longitudinal reinforcing rods, respectively, embedded adjacent a face. These rods are so located that the rods of any member are substantially in line with the centers of the spaces between adjacent longitudinal reinforcing rods embedded in the next wider member. Furthermore, other spaced longitudinal reinforcing rods embedded adjacent a face opposite to that mentioned have their center to center spacing differing between successive sizes of members by an amount which is an integral multiple of the increment of the widths of said sizes. Also the longitudinal reinforcing rods adjacent the four corners of the members have their center to center spacing on the four sides of the members, differing by an integral multiple of the increment of the depths of the members. That is, the reinforcing members in an opposite face have a difference in the center to center spacing from the other rod members which is an integral multiple of the difference in the width of the members.

The columns may have bases cast integral therewith, the width of the bases having a certain relation to the widths of the members. Similarly, the height of the bases is related to the height of some of the members. Anchor bolt holes are located in the bases on center-to-center spacings related to the spacing of the reinforcing rods of the members. Steel base plates may also be provided on concrete column shafts, their widths being related to the widths of the members and the anchor bolt holes being spaced in relation to the spacing of the longitudinal reinforcing rods of the members.

In all the members, the centers of the longitudinal reinforcing rods nearest the surfaces of the members are spaced substantially the same distance therefrom, 2½". Where the connections involve bolts, the heads thereof or the nuts threaded thereon may be embedded below the surface of the members and then mortared over for protection against fire and corrosion. As an alternative, a precast concrete cover may be applied to the nut or bolt heads for protection. This is desirable when erection proceeds during cold weather to eliminate the freezing of mortar applied in the field.

Nuts or pipes embedded in some of the members for securing tie means have anchors also embedded in the members and welded to the nuts and pipes. The concrete bond to the anchors is strong enough to substantially resist the shear stresses of the tie means.

This construction depends upon the relation of the spacing between the reinforcing rods of the members of various sizes and the location of holes therein with respect to said rods and the relation between the various brackets and splice plates with respect to the reinforcing rods and also tie means embedded therein, the members being secured together by bolts or dowels whose ends in many cases require protection from weather and fire by precast covers. The shear value of the tie means must not be greater than the bond of the concrete to anchors welded to the pipe or nuts embedded in centers of the members. All of these members have a definite mechanical relation one to the other.

Further details, novel features and advantages of my invention will become apparent during the following complete description which refers to the accompanying drawings.

In the drawings:

Figure 16 is a view partly in section and partly in elevation showing a modified connection between a column, girders and beams;

Figures 17 and 18 are sectional views through a column and girder showing the connection therebetween;

Figures 19 and 20 are a sectional view and elevation showing a column having a bracket member secured thereto;

Figure 21 is a sectional view of a column having a further modified form of bracket;

Figure 22 is a section through a column having a different form of bracket connection;

Figure 23 is a sectional view of a column having a still further form of bracket connection;

Figures 27 through 29 show the cooperation between the columns and the beams supported thereon.

Figure 1:
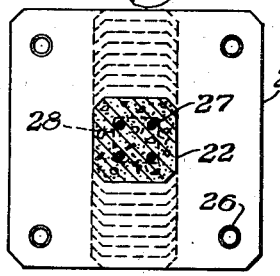
Figures 1 through 3 are horizontal sections through the shafts of column members of various dimensions showing the bases in plan.
Figure 2:
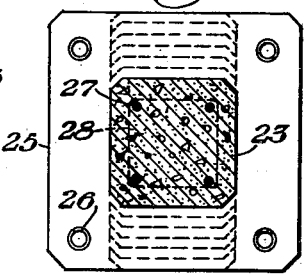
Figure 3:
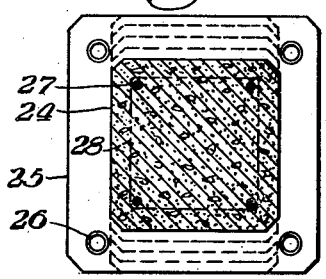
Figure 4:
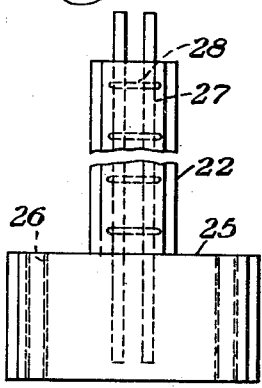
Figures 4 through 6 are side elevations of the columns.
Figure 5:
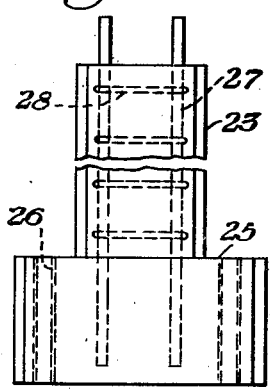
Figure 6:
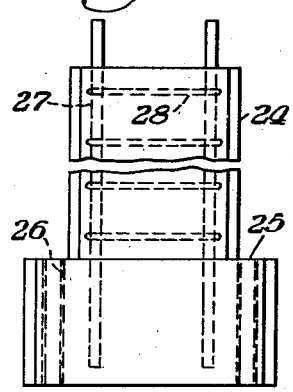

Figures 1 through 6 show precast members 22, 23 and 24 adapted to serve as columns. These members have integral bases 25 all having the same outside dimensions and height with anchor bolt holes 26 therethrough located on center lines which are the same distance apart in both directions in all the members. Reinforcing rods 27 are embedded in the shaft and base of each column and project outwardly above the upper end thereof. The bases may conveniently be 24" square and 12" high. The spacing of the anchor bolt holes may conveniently be 18" in both directions. This arrangement of common widths, depths and hole spacings simplifies both the design of a building and the field work incident to its erection.

The shaft of column 22 is preferably 8" x 8", that of the column 23, 12" x 12" and of the column 24, 16" x 16". Each of the columns may have one dimension of its shaft section increased by 2" steps (1" on each of two opposite sides) as illustrated in dotted lines. For instance, the column 22 may have a shaft 8" x 10", 8" x 12", 8" x 14", etc., column 23, a shaft 12" x 14", 12" x 16" and so on. The rods 27 of the column 22 are positioned on center lines 2½" inwardly from the faces of the column shaft and are 3" apart. The rods of the column 23 are similarly disposed relative to the column faces and are thus on centers 7" apart. Likewise the rods of column 24 are on centers 11" apart. As one dimension of the section of the column shaft is increased, the spacing of the rods in that direction is correspondingly increased, thus maintaining the rods the same distance from the faces of the column shaft in all sizes. The bars 27 have stirrups 28 spaced therealong. The same stirrups may be used for joists, beams and girders having the same sectional dimensions as the column shafts. For example, the stirrups used in the beam 17 (Figures 8 and 12) are the same as those used in the column 22.

Figure 7:
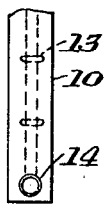
Figures 7 through 10 are partial plan views of the ends of members such as joists or beams.
Figure 11:
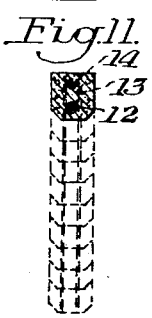
Figures 11 through 14 are transverse sections therethrough.

Figure 7 shows a precast concrete member 10, preferably 4" wide, which may be a post, girder, beam, joist or the like. If a beam, the member has upper and lower longitudinal reinforcing rods 11 and 12 embedded therein with stirrups 13 extending around the rods, as shown in Figure 11. A pipe length 14 is embedded vertically in the member adjacent each end and is welded to the rods 11 and 12. The memer 10 may conveniently be of any desired length and depth. The pipe length 14 preferably has an inside diameter of 1½" but in some cases smaller diameter pipe is used. The vertical hole through the member at each end provided by the embedded pipe length is adapted to receive a dowel extending from another member, such as a column supporting the beam 10. The space between the dowel and the interior of the pipe is filled with grout or other bonding material, and a rigid permanent connection therebetween is thus obtained.

Figure 8:
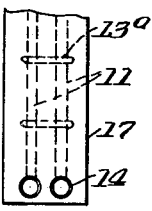
Figure 12:
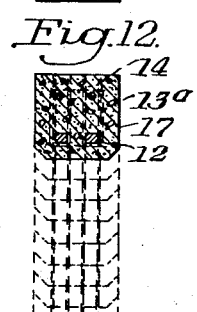

Figures 8 and 12 show a member 17 similar to that of Figure 1 except that it is twice as wide, e. g., 8", and has two upper and two lower reinforcing rods around which stirrups 13a extend, and two pipe lengths 14 embedded in each end. Corresponding parts are designated by the same numeral as in Figure 1. The pipe lengths are preferably positioned on centers 2½" inwardly from the side faces of the member and substantially 3" apart. The spacing of the reinforcing rods is preferably such as to permit a 1½" pipe to pass therebetween.

Figure 9:
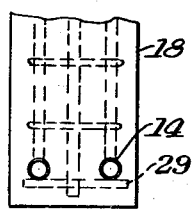
Figure 13:
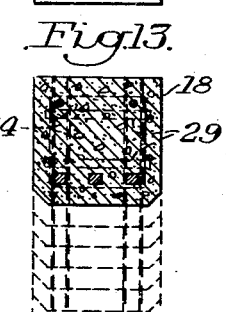

Figures 9 and 13 show the arrangement of the reinforcing rods and pipe lengths in a member 18, three times as wide as the member 10 and having two or three upper and three lower reinforcing rods around which stirrups 13b extend. The pipe lengths 14 are positioned on centers 2½" from the side faces of the member as in the member 17 and substantially 7" apart. The pipe lengths, instead of being welded to the ends of the outer reinforcing rods, could be positioned in contact with the sides of the middle reinforcing rods, as indicated at 19 and welded thereto. Pipe lengths so positioned would be substantially in alinement with pipe lengths positioned as in member 17 and might also be useful for receiving bolts securing adjacent members together. The center-to-center spacing of pipe lengths 19 is substantially 3" and they could receive longitudinal reinforcing rods projecting above an 8" column whose centers are also substantially 3" apart.

Figure 10:
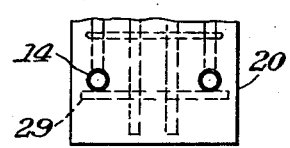
Figure 14:
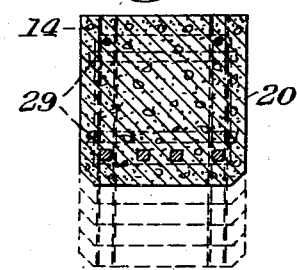

Figures 10 and 14 show a member 20 four times the width of the member 10, having two or more upper and four lower reinforcing rods around which stirrups 13c extend, and pipe lengths embedded therein. The pipe lengths, as in the members 10 and 17, have their centers spaced 2½" inwardly from the side faces of the member and 11" apart. They are welded to the outer reinforcing rods.

Figures 11 through 14 show that the beams 10, 17, 18 and 20 may be of various depths, increasing by increments of 2", e. g., 4" x 4", 4" x 6", 4" x 8"; 8" x 8"; 8" x 10", 8" x 12"; 12" x 12", 12" x 14", 12" x 16"; 16" x 16", 16" x 18", 16" x 20" and so on. Crossbars 29 are embedded in the ends of beams 18 and 20 and are welded to the pipe lengths 14 and to the reinforcing rods between those adjacent the side faces. This firmly bonds the concrete at the end of the beam to the pipe lengths. The difference between the vertical spacing of the rods in successive sizes of members is a multiple of the difference between the depths of such sizes.

Figure 15:
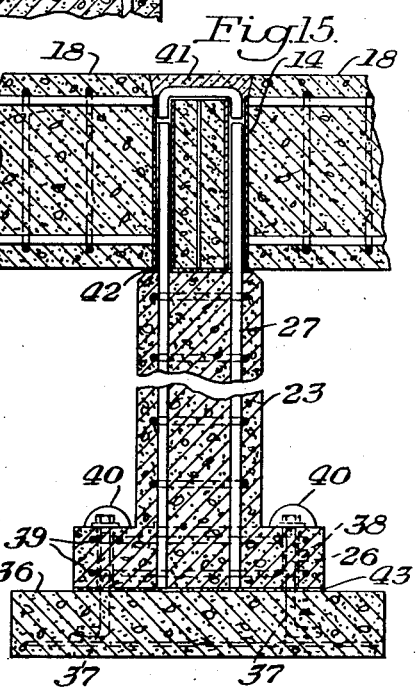
Figure 15 is a sectional view showing a column supporting the ends of a pair of girders.

Figure 15 illustrates a column-and-girder connection and shows the column construction in somewhat greater detail. A column such as that shown at 23 is secured to a field-cast footing 36. Anchor bolts 37 embedded therein project upwardly through the holes 26 in the column base which are formed by lengths 38 of 2" pipe embedded therein. The pipe lengths 38 are welded to stirrups 39 embedded in the column base. Protective covers 40 of reinforced concrete are applied to the nuts screwed onto the bolts 37.

As clearly shown in Figure 15, the pipe lengths 14 embedded in the ends of the beams 18 and welded to the upper and lower reinforcing rods thereof are adapted to receive the ends of the reinforcing rods 27 projecting above the upper end of the column 23. The top faces of the beams 18 may be notched from the upper ends of the pipe lengths 14 to the vertical end faces of the beams to accommodate a tie rod 41 having its ends bent at right angles and adapted to enter the pipe lengths 14. The rods 27 and tie bar 41 may be welded to pipes 14. The notches and the spaces around the bars 27 are filled with grout as indicated after the tie rods have been placed in position. A mat of asbestos 42 impregnated with cement in powder form when made, is wetted and disposed on top of the column before the beams 18 are placed thereon. The cement sets and forms a gasket with the asbestos mat insuring a good bearing for the beams on the column. Mats 42 are made in various sizes and punched with holes for the rods 27 to match the different sizes of columns. A layer of grout 43 is applied to the footing 36 before the column is set thereon. These gaskets also are made for the various sizes of brackets.

Figure 16 shows a column, such as 22, supporting a beam 20' similar to the beam 20 but having four pipe lengths embedded therein adjacent each end. The reinforcing rods 27 of the column extend upwardly through the inner pipe lengths 14 embedded in the end of the beam. Outer pipe lengths 14 embedded in the end of the beam accommodate bolts 78 securing floor slabs 79 to the beam. The slabs 79 are provided with pipe lengths 80 embedded therein through which the bolts 78 pass.

Figure 17 shows a 12" wide beam 18 resting on an 8" wide column 22. As shown, the column-reinforcing rods project into the pipe lengths 14 embedded in the ends of the beam which are welded to the beam-reinforcing rods. Figure 18 is a similar illustration of a 12" wide column 23 supporting a 16" wide beam 20.

Figures 19 through 23 show the connections between the brackets and the columns on which they are supported. Figures 19 and 20 show a column 22 having pipe lengths 133 extending therethrough between the reinforcing rods thereof and welded thereto. The bracket 134 has nuts 135 welded to the end and one side of a reinforcing bar embedded therein. Bolts 136 inserted through the pipe lengths are threaded into these nuts, thus firmly anchoring the bracket to the column.

Figure 21 shows a bracket 139 secured to a column 22 by bolts 140 inserted through alined pipe lengths embedded in the two members. The bracket 139 has dowels 141 extending upwardly therefrom adapted to enter the pipe lengths embedded in the ends of a beam or girder and spaced appropriately for that purpose.

Figure 22 shows a column like that shown at 23 with reinforcing rods, as shown in the member 18 of Figure 9, and a bracket 139a similar to that shown at 139. The column has double-length nuts 138 therein welded to the reinforcing rods and having embedded anchor rods 142 threaded thereinto. Bolts inserted through the pipe lengths embedded in the bracket and welded to the reinforcing rods therein are threaded into nuts. The bracket 139a has dowels similar to those of the bracket 139.

Figure 23 shows a hollow column 23' having a bracket 143 secured thereto by bolts 136 turned into nuts 138 welded to the reinforcing rods in the column. The pipe lengths 133 embedded in the bracket are welded to the reinforcing rods thereof. The bracket 143, being 12" wide, is adapted to support a beam 18 and the dowels 141 are adapted to extend into the pipe lengths embedded in the beam. The column 23 in Figure 23 has a central longitudinal void to provide a duct for air or pipe lines.

Figure 24:
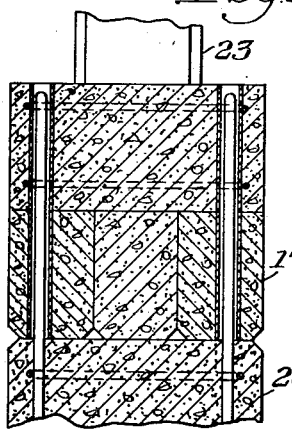
Figures 24 through 26 are sectional views showing further modified column and girder assemblies.

Figure 24 shows a 24" wide column 24 supporting three 8" wide beams 17. A column 23 rests on the beams. The reinforcing rods of the columns are on centers substantially 2½" from the sides thereof and the same is true of the pipe lengths embedded in the beams and column bases. Thus the reinforcing rods of the column 24 register with the pipe lengths embedded in the beams and in the base of the column 23.

Figure 25:
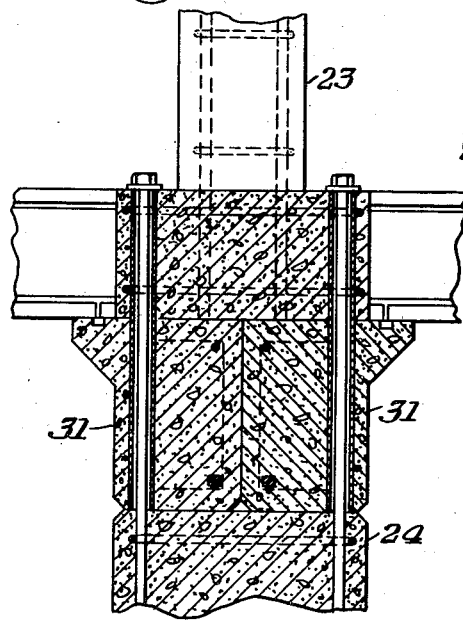

Figure 25 similarly shows a 24" wide column 24 supporting a pair of girders 31 both 12" wide and having pipe lengths embedded therein in such position as to register with the reinforcing rods of the column. A column 23 resting on the girders has its embedded pipe lengths registering with those in the girders so the reinforcing rods of the column 24 may extend upwardly therethrough.

Figure 26:
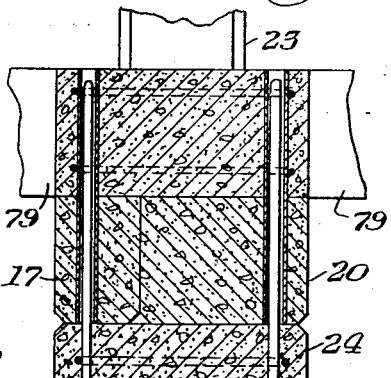

Figure 26 shows a 24" wide column 24 supporting an 8" wide beam 17 and 16" wide beam 20 of the same depth. A column 23 rests on the beams. The pipe lengths embedded in the beams register with those in the column 23 and with the reinforcing rods in the column 24, whereby the latter may project upwardly therethrough.

Figures 27 through 29 show the relation between the widths of the members and the identity of the spacing of the embedded pipe lengths in the opposed beams with that of the reinforcing rods in the columns. In Figure 27 a column 22 supports beams 17. If the column 22 is 8 x 8", the reinforcing rods being on centers 2½" inwardly from the faces of the column, these centers are substantially 3" apart. The same is true of the pipe lengths in the adjacent ends of the beams, allowing a slight space between said ends as shown. The column may also be 8" x 12" or 8" x 16" for correspondingly wider beams but the proper relation exists in all cases to permit the pipe lengths in the beams to accommodate the projecting ends of the reinforcing rods of the column. Figure 28 shows a column 23 supporting beams 17 with a beam 18 therebetween of the same depth as the latter, the column being 12" wide and the beam 18 being 4" wide. The pipe lengths in the ends of the beams 17 still register with the outside reinforcing rods in the column as shown. The pipe lengths embedded in the beam 18, furthermore, register with the intermediate reinforcing rods of the column. The distance between the centers of the outside column reinforcing rods is substantially 7" and the same spacing exists between the center lines of the pipe lengths in the beams 17.

Figure 29 shows a column 24 supporting beams 17 with a similar beam 17a therebetween. Since the column 24 is 16" wide, and the width of the beam 17a is 8", the outside column reinforcing rods which are spaced on 11" centers matches the pipe lengths in the ends of the beams 17. The inside column reinforcing rods, being spaced on 3" centers, match the pipe lengths embedded in the ends of the beams 17a.

Figure 30:
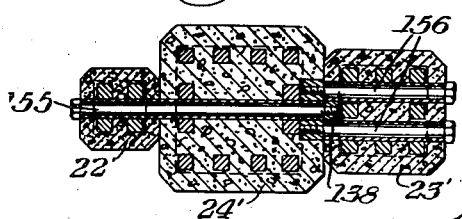
Figure 30 is a transverse section through a composite column composed of two or more precast members secured together side-by-side.

Figure 30 shows a composite column made up of a column 24' flanked on one side by a column 22' and on the other by a column 23'. These columns are similar to those shown at 22, 23 and 24 but are without integral bases. This arrangement is useful in such cases as a factory aisle. In such locations the column 24' carries the main load, the columns 23' carry crane runways and the column 22' a mezzanine floor. Bolts 155 are inserted through pipe lengths welded to the reinforcing rods of the columns 22' and 24' as shown and are threaded into nuts 138 embedded in the column 23' and welded to reinforcing rods thereof. Similarly, bolts 156 secure the column 23' to the column 24'.

It will be apparent from the foregoing description and explanation that my invention provides a complete system of integrated reinforced concrete structural members of various dimensions, the several types of units having their reinforcing rods similarly disposed, in corresponding sizes, whereby connections between adjacent members may readily be established by means of the embedded pipe lengths welded to the reinforced rods and dowels or bolts extending therethrough and into other members. I thus provide a system embodying a relatively few standard units, such as columns, girders, beams, brackets, pipe, splice plates and the like, which can be made in various sizes differing from each other by standard increments of width, thickness and depth. All these members may accordingly be cast in the same molds and stirrups of the same dimensions may be used with the reinforcing rods of various types of members in corresponding sizes.

The connections provided for securing adjacent members together may be easily made and provide a rigid anchorage of each member to the others. This results from the welding of the pipe lengths to the reinforcing rods and the filling of the space between the interior of the pipe lengths and dowels or bolts extending therethrough with grout, thereby preventing any looseness of shifting of the members. The connections between beams or girders and columns, furthermore, are adapted particularly for transmitting shear load directly to the column reinforcing rods.

The asbestos gasket disposed on top of the column or bracket before placing girders or beams thereon insures full bearing and uniform distribution of the load despite slight imperfections in the adjacent surfaces. The nut covers provide ample protection against fire and corrosion for the nuts and heads of the bolts used in the connection.

The spacing between centers of the reinforcing rods and also the embedded pipe lengths varies between the members of different widths by the same increments as the widths themselves. In all the members, the reinforcing rods and embedded pipe lengths have their centers spaced the same distances substantially from the adjacent surfaces of the members. This brings the reinforcing rods and embedded pipe lengths of meeting members in the same plane and makes for simplicity in the connections therebetween.

The total section of the reinforcing rods embedded in members of various widths also varies as the widths themselves, i. e., a member 4" wide will have one tension reinforcing rod, a member 8" wide will have two, a member 12" wide will have three and a member 16" wide will have four. In the case of columns, only the outside rods would be used in most cases.

The use of 1½" pipe for the embedded pipe lengths permits the accommodation therein of rods of square section up to a maximum size of 1⅛" on a side. The actual inside diameter of 1½" pipe is practically 1⅝" and its outside diameter approximately 2". This permits 1½" bolts to be inserted through the pipe lengths for making connections although smaller bolts and pipes may be used where they have sufficient section to support the load applied. Smaller pipe may also be used particularly in the brackets in order to maintain the desired thickness of concrete around them in all directions. The area between the bolts and inside of the pipes may be filled with grout or the bolts may have a snug fit in the pipes. Other filling material may be used, such as sulphur or other molten material.

Although I have illustrated several preferred embodiments with modifications, it will be apparent that changes in the details disclosed herein may be made without departing from the spirit of the invention or the scope of the appended claims.

The present application is a divisional application of my application Ser. No. 593,220, filed May 11, 1945, entitled "Precast reinforced concrete members," now Patent 2,396,045.

I claim:

1. In a building construction comprising a plurality of precast reinforced concrete members of rectangular sections whose widths increase progressively by a uniform increment, spaced longitudinal reinforcing bars embedded in each member adjacent a side thereof, a member of any width having one more longitudinal reinforcing bar than the next narrower member, and said reinforcing bars being so spaced in their respective members that the bars of a member of any width substantially coincide with the centers of the spaces between the bars of the next wider member, tie means transversely disposed between the bars in a narrower member being secured to at least one of the bars in the next wider member, said narrower and next wider members being assembled in centrally abutting relation to each other.

2. A building construction comprising a plurality of precast reinforced concrete members of different widths and rectangular cross-section including a first member and a second member, spaced longitudinal reinforcing bars embedded in each of said members and adjacent a side thereof, the reinforcing bars in the first member being so spaced that they substantially coincide with the centers of the spaces between the reinforcing bars in said second member, and tie means disposed transversely between said bars in said second member engaging one of said bars in said first member, said two members being assembled in centrally abutting relation to each other.

3. A building construction comprising a plurality of precast reinforced concrete members of different widths and rectangular cross-section, including a first member and a second member, spaced longitudinal reinforcing bars embedded in each of said members adjacent a side thereof, the reinforcing bars in said first member being so spaced that they substantially coincide with the centers of the spaces between the reinforcing bars in said second member, the reinforcing bars in said first member extending beyond an end thereof and through the second member centrally between the bars thereof to form a tie means, said two members being assembled in centrally abutting relation to each other.

4. A building construction comprising a plurality of precast reinforced concrete members of rectangular cross-section including a first member and a second member having different widths, said first member having two spaced longitudinal reinforcing bars embedded therein adjacent a side thereof and projecting from one end thereof, said second member having embedded therein three equally spaced longitudinal reinforcing bars adjacent a side thereof, holes in said second member disposed transversely of and centrally between said three bars, the spacing of said bars in said first member substantially coinciding with the centers of the spaces between the bars in said second member, the projecting ends of the bars of the first member coinciding with and extending into said holes in the second member, said two members being assembled in centrally abutting relation to each other.

5. A building construction comprising a plurality of precast reinforced concrete members of different widths and rectangular cross-section including a first member and a second member, said two members being assembled in centrally abutting relation to each other, spaced longitudinal reinforcing bars embedded in each of said members adjacent a side thereof, said reinforcing bars in said first member being so spaced that they substantially coincide with the centers of the spaces between the said reinforcing bars in said second member, and spaced tie means disposed transversely between said bars in said second member said tie means projecting from, coinciding with and coacting with said bars embedded in said first member.

ALBERT HENDERSON.

REFERENCES CITED

The following references are of record in the file of this patent:

UNITED STATES PATENTS

| Number | Name | Date |
|---|---|---|
| 1,380,324 | Piggins | May 31, 1921 |
| 2,137,009 | Stromberg | Nov. 15, 1938 |
| 1,259,698 | Wilson | Mar. 19, 1918 |
| 1,083,876 | Craig | Jan. 6, 1914 |

FOREIGN PATENTS

| Number | Country | Date |
|---|---|---|
| 497,791 | France | Dec. 17, 1919 |
| 510,055 | France | Aug. 30, 1920 |
| 341,597 | France | Aug. 11, 1904 |
| 158,825 | Great Britain | May 19, 1922 |
| 426,705 | France | Mar. 1, 1911 |